US012703086B2

(12) United States Patent
Aparicio Ojea et al.

(10) Patent No.: US 12,703,086 B2
(45) Date of Patent: Aug. 11, 2026

(54) TRANSFORMATION FOR COVARIATE SHIFT OF GRASP NEURAL NETWORKS

(71) Applicant: Siemens Aktiengesellschaft, Munich (DE)

(72) Inventors: Juan L Aparicio Ojea, Moraga, CA (US); Heiko Claussen, Wayland, MA (US); Ines Ugalde Diaz, Redwood City, CA (US); Gokul Narayanan Sathya Narayanan, Emeryville, CA (US); Eugen Solowjow, Berkeley, CA (US); Chengtao Wen, Redwood City, CA (US); Wei Xi Xia, Daly City, CA (US); Yash Shahapurkar, Berkeley, CA (US); Shashank Tamaskar, Punjab (IN)

(73) Assignee: Siemens Aktiengesellschaft, Munich (DE)

( * ) Notice: Subject to any disclaimer, the term of this patent is extended or adjusted under 35 U.S.C. 154(b) by 172 days.

(21) Appl. No.: 18/555,780

(22) PCT Filed: May 25, 2021

(86) PCT No.: PCT/US2021/034023

§ 371 (c)(1),
(2) Date: Oct. 17, 2023

(87) PCT Pub. No.: WO2022/250658

PCT Pub. Date: Dec. 1, 2022

(65) Prior Publication Data

US 2024/0198515 A1 Jun. 20, 2024

(51) Int. Cl.
*B25J 9/16* (2006.01)
*G05B 19/4155* (2006.01)
(Continued)

(52) U.S. Cl.
CPC ........ *B25J 9/1612* (2013.01); *G05B 19/4155* (2013.01); *G06T 7/0004* (2013.01);
(Continued)

(58) Field of Classification Search
CPC ............... B25J 9/1612; G05B 19/4155; G05B 2219/40269; G05B 2219/39543;
(Continued)

(56) References Cited

U.S. PATENT DOCUMENTS

2021/0187741 A1* 6/2021 Marthi .................. B25J 9/1676
2022/0016767 A1* 1/2022 Ku ......................... B25J 9/1697
(Continued)

OTHER PUBLICATIONS

Matl et al., "Learning Robotic Grasping Policies for Suction Cups and Parallel Jaws in Simulation", Aug. 16, 2019, Electrical Engineering and Computer Sciences at University of California at Berkeley, pp. 1-47. (Year: 2019).*
(Continued)

*Primary Examiner* — Wade Miles
*Assistant Examiner* — Sidney Leigh Molnar

(57) ABSTRACT

A covariate shift generally refers to the change of the distribution of the input data (e.g., noise distribution) between the training and inference regimes. Such covariate shifts can degrade the performance grasping neural networks, and thus robotic grasping operations. As described herein, an output of a grasp neural network can be transformed, so as to determine appropriate locations on a given object for a robot or autonomous machine to grasp.

11 Claims, 6 Drawing Sheets

(51) Int. Cl.
*G06T 7/00* (2017.01)
*G06T 7/70* (2017.01)

(52) U.S. Cl.
CPC ...... *G06T 7/70* (2017.01); *G05B 2219/40269* (2013.01); *G06T 2207/20081* (2013.01); *G06T 2207/20084* (2013.01)

(58) Field of Classification Search
CPC ........... G05B 2219/40584; G05B 2219/40613; G06T 7/0004; G06T 7/70; G06T 2207/20081; G06T 2207/20084; G06V 10/82; G06V 20/10
USPC ................. 700/245–264; 318/568.11–568.25
See application file for complete search history.

(56) References Cited

U.S. PATENT DOCUMENTS

| | | | | |
|---|---|---|---|---|
| 2022/0072707 | A1* | 3/2022 | Fan | G06V 20/64 |
| 2023/0125022 | A1* | 4/2023 | Li | B25J 9/023 700/245 |

OTHER PUBLICATIONS

D. Kent and R. Toris, "Adaptive Autonomous Grasp Selection via Pairwise Ranking," 2018 IEEE/RSJ International Conference on Intelligent Robots and Systems (IROS), Madrid, Spain, 2018, pp. 2971-2976, doi: 10.1109/IROS.2018.8594105. (Year: 2018).*

Jiang P, Oaki J, Ishihara Y, Ooga J, Han H, Sugahara A, Tokura S, Eto H, Komoda K and Ogawa A (2022) Learning Suction Graspability Considering Grasp Quality and Robot Reachability for Bin-Picking. Front. Neurorobot. 16:806898. doi: 10.3389/fnbot.2022.806898 (Year: 2022).*

Berenson, Dmitry. Constrained manipulation planning. Carnegie Mellon University, 2011. (Year: 2011).*

E. Chinellato, R. B. Fisher, A. Morales and A. P. del Pobil, "Ranking planar grasp configurations for a three-finger hand," 2003 IEEE International Conference on Robotics and Automation (Cat. No. 03CH37422), Taipei, Taiwan, 2003, pp. 1133-1138 vol. 1, doi: 10.1109/ROBOT.2003.1241745. (Year: 2003).*

Iretiayo, Akinola et al: "Dynamic Grasping with Reachability and Motion Awareness"; arxiv.org, Cornell University Library, 201 Olin Library Cornell University Ithaca, NY 14853; Mar. 18, 2021 (Mar. 18, 2021), XP081913338.

Shafii, Nima et al: "Autonomous Interactive Object Manipulation and Navigation Capabilities for an Intelligent Wheelchair"; Computer Vision—ECCV 2020 : 16th European Conference, Glasgow, UK, Aug. 23-28, 2020 : Proceedings; Part of the Lecture Notes in Computer Science; ISSN 0302-9743; [Lecture Notes in Computer Science; Lect.Notes Computer], Springer International PU; Aug. 9, 2017 (Aug. 9, 2017), XP047525051.

Eugen Solowjow et al: "Industrial Robot Grasping with Deep Learning using a Programmable Logic Contro 11 er (PLC)", arxiv.org, Cornell University Library, 201 Olin Library Cornell University Ithaca, NY 14853, Apr. 21, 2020 (Apr. 21, 2020).

Satish, Vishal et al: "On-Policy Dataset Synthesis for Learning Robot Grasping Policies Using Fully Convolutional Deep Networks"; IEEE Robotics and Automation Letters, IEEE; vol. 4, No. 2, Apr. 1, 2019 (Apr. 1, 2019), pp. 1357-1364, XP011711155.

Mahler, Jeffrey et al: "Learning ambidextrous robot grasping policies"; Jan. 16, 2019 (Jan. 16, 2019), pp. 1-11, XP55889804.

Park Dongwon et al. "A Single Multi-Task Deep Neural Network with Post-Processing for Object Detection with Reasoning and Robotic Grasp Detection"; "2020 IEEE International Conference on Robotics and Automation"; pp. 7300-7306; Sep. 15, 2020.

* cited by examiner

TRANSFORMATION FOR COVARIATE SHIFT OF GRASP NEURAL NETWORKS

BACKGROUND

Artificial Intelligence (AI) and robotics are a powerful combination for automating tasks inside and outside of the factory setting. Autonomous operations in dynamic environments may be applied to mass customization (e.g., high-mix, low-volume manufacturing), on-demand flexible manufacturing processes in smart factories, warehouse automation in smart stores, automated deliveries from distribution centers in smart logistics, and the like. In order to perform autonomous operations, such as grasping and manipulation, robots may learn skills through exploring the environment. In particular, for example, robots might interact with different objects under different situations. Three-dimensional (3D) reconstruction of an object or of an environment can create a digital twin or model of a given environment of a robot, or of a robot or portion of a robot, which can enable a robot to learn skills efficiently and safely.

By way of example, grasping neural networks can be used to compute the grasp for a robot to pick up an object. In some cases, grasping networks can be trained on synthetic data so as to compute grasp points using real images of a given object. It is recognized herein, however, that a covariate shift can be common when such networks are deployed with real camera data. A covariate shift generally refers to the change of the distribution of the input data (e.g., noise distribution) between the training and inference regimes. Such covariate shifts can degrade the performance grasping neural networks, and thus robotic grasping operations.

BRIEF SUMMARY

Embodiments of the invention address and overcome one or more of the described-herein shortcomings or technical problems by providing methods, systems, and apparatuses for addressing covariate shifts in grasping neural networks, among others. In particular, an output of a grasp neural network can be transformed, so as to determine appropriate locations on a given object for a robot or autonomous machine to grasp.

In an example aspect, an image of an object within a physical environment is captured. Each of the object and the physical environment can define a plurality of locations. The image can define a plurality of pixels representative of the plurality of locations of the object and the physical environment. The image of the object within the physical environment can be sent to a neural network. Based on the image, the neural network can generate an output that defines respective grasp scores associated with the plurality of pixels. The grasp scores may indicate a respective grasp quality at the locations of the object represented by the respective pixel. In accordance with various embodiments, the output of the neural network is transformed. Based on transforming the output of the neural network, a grasp location of the plurality of locations of the object can be selected. In some cases, an instruction is sent to an autonomous machine to grasp the object at the grasp location. Based on the instruction and/or based on the transformation of the neural network output, the autonomous machine can grasp the object at the grasp location.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

It is recognized herein that current grasping neural networks are often convolutional, such that the networks can label each pixel of an input frame with some type of grasp affordance metric. Such networks may define a grasp parametrization that may consist of the x, y, and z coordinates, and an approach direction for the grasp. If such networks are trained on synthetic data, it is recognized herein that a covariate shift may be common when the neural network is deployed with real camera data. More generally, covariate shift can occur if runtime inputs to the neural network is different than training inputs to the neural network. By way of example, sensor noise, among other causes, can result in covariate shift. Such covariate shift may result in the neural network generating sub-optimal, or incorrect, labels for the pixels of an input frame, which can further result in poor robotic operations.

It is further recognized herein that current approaches to mitigating runtime effects of covariate shifts generally focus on generating the synthetic data used to train the neural network. By way of example, one approach is to improve the model of the camera noise so that the synthetic images used for training are closer to real world counterparts. Another example approach is to adjust the camera height in the simulation according to the real-world camera height. Such approaches to mitigating covariate shifts can be referred to as counter-measures at the data generation stage. It is recognized herein, however, that such counter-measures can be cumbersome or cost-prohibitive. For example, regenerating data and retraining neural networks can be computationally expensive. Further, in some cases, training and deployment/runtime are decoupled, for example, so that customers do not have access to the data generation framework, which may prevent access to the training data generation pipeline. In accordance with various embodiments described herein, covariate shift and negative effects thereof are addressed at the runtime output of a neural network, rather than at the training input, or data generation stage.

Figure 1:
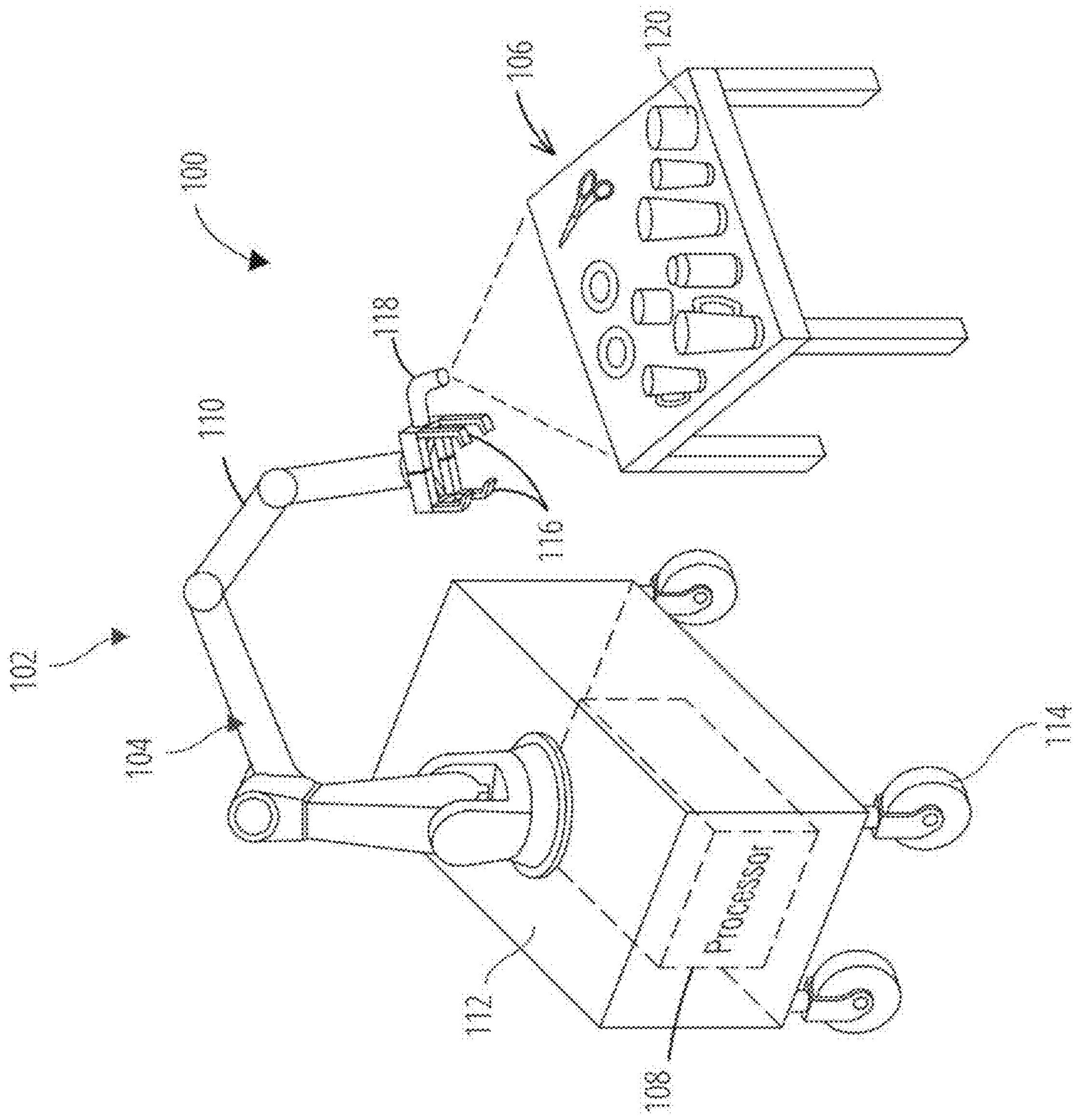
FIG. 1 shows an example system that includes an autonomous machine in an example physical environment that includes various objects, in accordance with an example embodiment.

Referring now to FIG. 1, an example industrial or physical environment 100 is shown. As used herein, a physical environment can refer to any unknown or dynamic industrial environment. A reconstruction or model may define a virtual representation of the physical environment 100 or one or more objects 106 within the physical environment 100. The physical environment 100 can include a computerized autonomous system 102 configured to perform one or more manufacturing operations, such as assembly, transport, or the like. The autonomous system 102 can include one or more robot devices or autonomous machines, for instance an autonomous machine or robot device 104, configured to perform one or more industrial tasks, such as bin picking, grasping, or the like. The system 102 can include one or more computing processors configured to process information and control operations of the system 102, in particular the autonomous machine 104. The autonomous machine 104 can include one or more processors, for instance a processor 108, configured to process information and/or control various operations associated with the autonomous machine 104. An autonomous system for operating an autonomous machine within a physical environment can further include a memory for storing modules. The processors can further be configured to execute the modules so as to process information and generate models based on the information. It will be understood that the illustrated environment 100 and the system 102 are simplified for purposes of example. The environment 100 and the system 102 may vary as desired, and all such systems and environments are contemplated as being within the scope of this disclosure.

Still referring to FIG. 1, the autonomous machine 104 can further include a robotic arm or manipulator 110 and a base 112 configured to support the robotic manipulator 110. The base 112 can include wheels 114 or can otherwise be configured to move within the physical environment 100. The autonomous machine 104 can further include an end effector 116 attached to the robotic manipulator 110. The end effector 116 can include one or more tools configured to grasp and/or move objects 106. Example end effectors 116 include finger grippers or vacuum-based grippers. The robotic manipulator 110 can be configured to move so as to change the position of the end effector 116, for example, so as to place or move objects 106 within the physical environment 100. The system 102 can further include one or more cameras or sensors, for instance a three-dimensional (3D) point cloud camera 118, configured to detect or record objects 106 within the physical environment 100. The camera 118 can be mounted to the robotic manipulator 110 or otherwise configured to generate a 3D point cloud of a given scene, for instance the physical environment 100. Alternatively, or additionally, the one or more cameras of the system 102 can include one or more standard two-dimensional (2D) cameras that can record or capture images (e.g., RGB images or depth images) from different viewpoints. Those images can be used to construct 3D images. For example, a 2D camera can be mounted to the robotic manipulator 110 so as to capture images from perspectives along a given trajectory defined by the manipulator 110.

With continuing reference to FIG. 1, in an example, one or more cameras can be positioned over the autonomous machine 104, or can otherwise be disposed so as to continuously monitor any objects within the environment 100. For example, when an object, for instance one of the objects 106, is disposed or moved within the environment 100, the camera 118 can detect the object. In an example, the processor 108 can determine whether a given object that is detected is recognized by the autonomous system 102, so as to determine whether an object is classified as known or unknown (new). In some examples, a deep neural network is trained on a set of objects. Based on its training, the deep neural network can calculate grasp scores for respective regions of a given new object when the object is detected within the environment 100. In an example, when the grasp score is larger than a predefined threshold, the region associated with the graph score is classified as an area in which the end effector 116, for instance a vacuum-based gripper, can grasp. Conversely, in an example, when the grasp score is lower than the predefined threshold, region associated with the graph score is classified as an area (e.g., edge, negative space) other than an area in which the end effector 116, for instance a vacuum-based gripper, can grasp.

Figure 2:
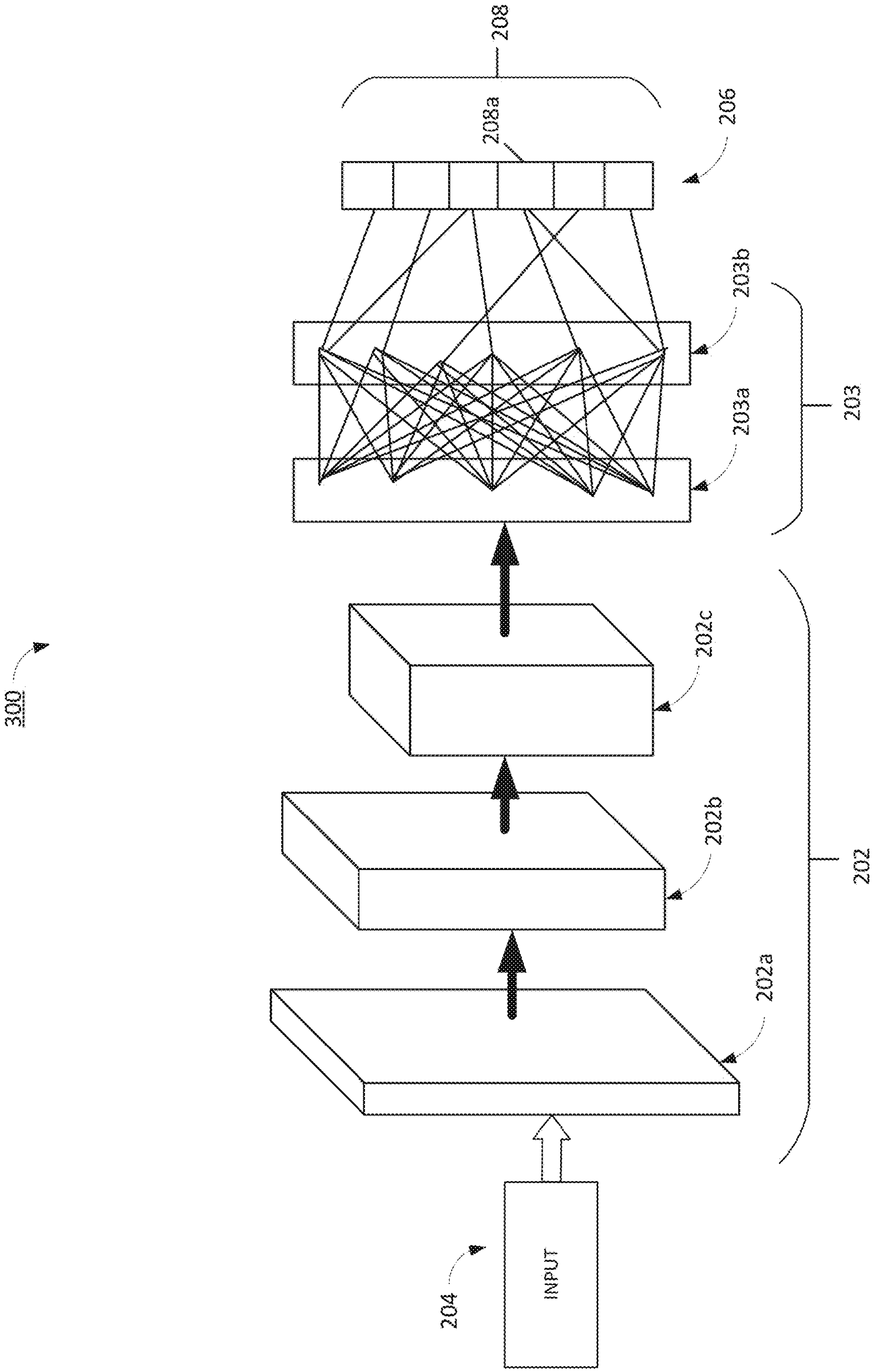
FIG. 2 illustrates an example neural network that can part of the system illustrated in FIG. 1, wherein the neural network can be configured to determine grasping locations on objects for the autonomous machine, in accordance with an example embodiment.

As described above, the robot device 104 and/or the system 102 can define one or more neural networks configured to learn various objects so as to identify grasp points (or locations) of various objects that can be found within various industrial environments. Referring now to FIG. 2, an example system or neural network model 200 can be configured to learn objects and grasp locations, based on images for example, in accordance with various example embodiments. After the neural network 200 is trained, for example, images of objects can be sent to the neural network 200 by the robot device 104 for classification, in particular classification of grasp locations.

The example neural network 200 includes a plurality of layers, for instance an input layer 202*a* configured to receive an image, an output layer 203*b* configured to generate class or output scores associated with the image or portions of the image. For example, the output layer 203*b* can be configured to label each pixel of an input image with a grasp affordance metric. In some cases, the grasp affordance metric or grasp score indicates a probability that the associated grasp will be successful. Success generally refers to an object being grasped and carried without the object dropping. The neural network 200 further includes a plurality of intermediate layers connected between the input layer 202*a* and the output layer 203*b*. In particular, in some cases, the intermediate layers and the input layer 202*a* can define a plurality of convolutional layers 202. The intermediate layers can further include one or more fully connected layers 203. The convolutional layers 202 can include the input layer 202*a* configured to receive training and test data, such as images. In some cases, training data that the input layer 202*a* receives includes synthetic data of arbitrary objects. Synthetic data can refer to training data that has been created in simulation so as to resemble actual camera images. The convolutional layers 202 can further include a final convolutional or last feature layer 202*c*, and one or more intermediate or second convolutional layers 202*b* disposed between the input layer 202*a* and the final convolutional layer 202*c*. It will be understood that the illustrated model 200 is simplified for purposes of example. In particular, for example, models may include any number of layers as desired, in particular any number of intermediate layers, and all such models are contemplated as being within the scope of this disclosure.

The fully connected layers 203, which can include a first layer 203*a* and a second or output layer 203*b*, include connections between layers that are fully connected. For example, a neuron in the first layer 203*a* may communicate its output to every neuron in the second layer 203*b*, such that each neuron in the second layer 203*b* will receive input from every neuron in the first layer 203*a*. It will again be understood that the model is simplified for purposes of explanation, and that the model 200 is not limited to the number of illustrated fully connected layers 203. In contrast to the fully connected layers, the convolutional layers 202 may be locally connected, such that, for example, the neurons in the intermediate layer 202*b* might be connected to a limited number of neurons in the final convolutional layer 202*c*. The convolutional layers 202 can also be configured to share connections strengths associated with the strength of each neuron.

Still referring to FIG. 2, the input layer 202*a* can be configured to receive inputs 204, for instance an image 204, and the output layer 203*b* can be configured to return an output 206. In some cases, the input 204 can define a depth frame image of an object captured by one or more cameras pointed toward the object, such as the cameras of the system 102. The output 206 can include one or more classifications or scores associated with the input 204. For example, the output 206 can include an output vector that indicates a plurality of scores 208 associated with various portions, for instance pixels, of the corresponding input 204. By way of example, referring also to FIG. 1 and FIG. 3, the input 204 can define a depth image of an object 120, for instance a bottle 300. Based on the image of the bottle 300, the output 206 can include various scores 208 associated with pixels of the input image 204, and thus regions of the bottle 300. For example, grasp scores can be associated with respective regions of the bottle 300. Grasp scores can indicate the best locations for grasping an object based on the particular end effector 116. By way of example, the best locations for grasping the bottle 300 having a lid 302 with a vacuum-based gripper might include areas of the lid 302 that are a minimum distance away from the edges of the lid 302.

Thus, the output layer 203*b* can be configured to generate grasp scores 208 associated with the image 204, in particular associated with pixels of the image 204, thereby generating grasp scores associated with locations of the object depicted in the image 204. The scores 208 can include a target score 208*a* associated with an optimal grasp location of the image 204 for a given end effector 116. The grasp scores 208 can further include one or more confused or incorrect grasp scores, for example, that can result from covariate shift. In the bottle example described herein, when the end effector 116 defines a vacuum-based gripper, the target class score 208*a* can correspond to the center of the lid 302. As described herein, the output layer 203*b* can be configured to generate grasp scores 208 associated with various regions of various objects used in industrial settings, such as doors, handles, user interfaces, displays, workpieces, holes, plugs, or the like.

The input 204 is also referred to as the image 204 for purposes of example, but embodiments are not so limited. The input 204 can be an industrial image, for instance an image that includes a part that is classified so as to identify a grasp region for an assembly. It will be understood that the model 200 can provide visual recognition and classification of various objects and/or images captured by various sensors or cameras, and all such objects and images are contemplated as being within the scope of this disclosure.

Figure 3:
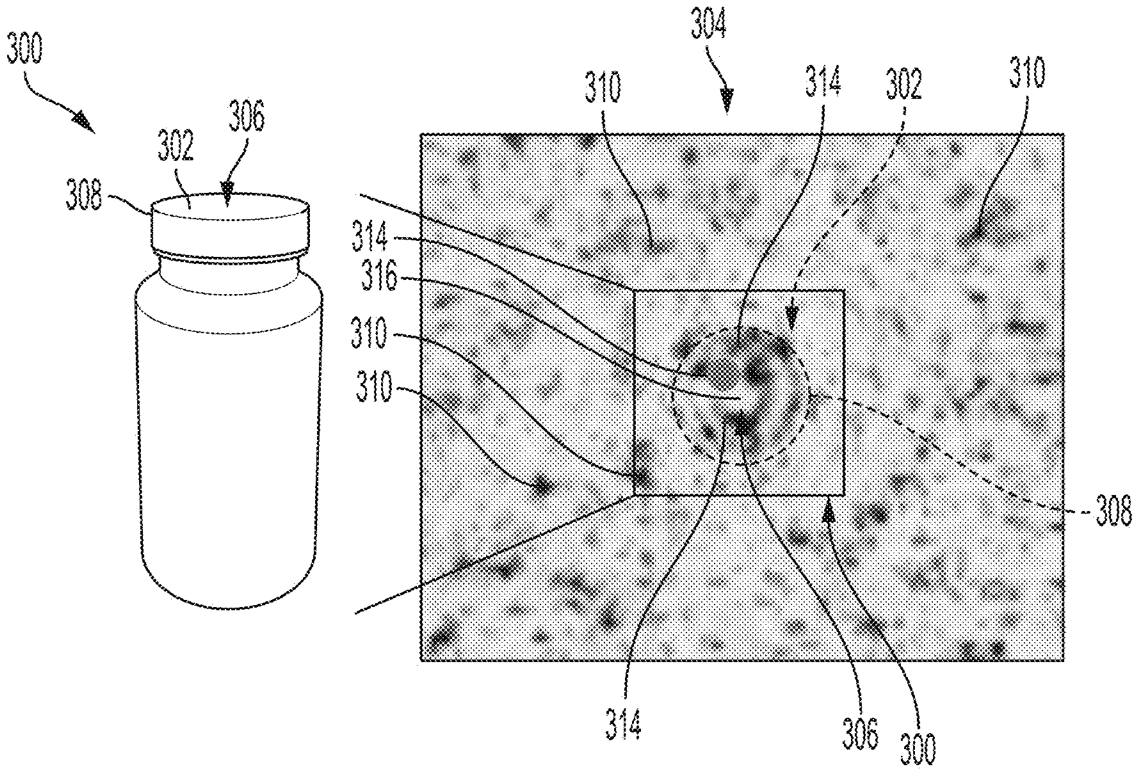
FIG. 3 depicts an example grasping neural network output, for instance an output of the neural network depicted in FIG. 2, for an example object.

Referring in particular to FIG. 3, an example grasp neural network output 304 is shown that corresponds to the bottle 300 as the input to the grasp neural network. By way of example, a depth frame image of the bottle 300 can define the input 204 that is processed by the model 200 so as to generate the output 304. The output 304 of the grasp neural network is based on a vacuum gripper, such that the output 304 is intended to indicate grasp locations for the vacuum gripper. The grasp neural network output 304 illustrates an example covariate shift, as further described herein. In the example, the image of the bottle 300 that is processed is captured by a camera pointing downward at the lid 302. In the example, the output 304 defines pixel-wise labels associated with grasp locations. For example, the pixel-wise labels can be conveyed as colors, such that the grasp neural network output 304 can define a color map. Different colors can indicate grasp scores associated with respective locations, such that the pixel (which corresponds to a location on the bottle 300) having the best grasp score has a particular color. It will be understood that the grasp scores can be indicated on the output 304 with alternative indications, such that the output 304 is not limited to color maps, and all such alternative indications of the grasp scores or locations are contemplated as being within the scope of this disclosure.

Still referring to FIG. 3, example problems introduced by covariate shifts are illustrated. In particular, the example output 304 indicates various grasp locations 314 on the lid 302 of the bottle 300. The lid 302 defines a center 306 and an edge 308 about the center 306. In an example, the best grasp location for a vacuum gripper on the lid 302 is at the center 306. In some cases, it is expected that the vacuum gripper can grasp most portions of the lid 302, and thus the output 304 should define locations on the lid 302 as having a good grasp score. It is recognized herein, however, that because of covariate shift, the output 304 defines locations 310 that are not on the lid 302 as having a good grasp score. In some cases, the locations 310 having a good grasp score not on the bottle 300 at all. Mislabeled locations, such as the locations 310, can result from noise at the camera that obtains the image of the bottle 300, among other causes. Further, the output 306 defines a location 316 that includes the center 306 of the lid 302 as having a low grasp score. Further still, the output 306 indicates that a location 312 has the best grasp score, and thus should be the best location for the vacuum gripper to grasp the bottle 300. But the location 312 does not include the center 306, and the location 312 is close to the edge 308, which can inhibit the grasp strength of the vacuum gripper's grasp. It will be understood that misidentifying the edge 308 can inhibit the grasp quality of various end effectors 116, and thus is not a problem only associated with a vacuum gripper. In the example, the location 316 having the low grasp score includes the center 306. Thus, as shown, covariate shift can lessen the accuracy of the output of a grasp neural network, such as the model 200, which can result in further problems during robotic operations that are based on the output of the neural network.

To address the covariate shift and problems that result from covariate shift, embodiments described herein can transform neural network outputs, for instance the output 304, so as to improve the accuracy of grasp locations that are identified, thereby increasing grasp success rates. For example, when grasps are executed based on transformed neural network outputs in accordance with an embodiment, empirical grasp success rates can be increased.

Referring again to FIG. 2, in accordance with some embodiments, the neural network output scores 208 that can be associated with respective pixels of the input 204 are sorted. For example, the output scores 208 can be sorted in order of grasp quality, for instance from highest to lowest or lowest to highest. It is recognized herein that current approaches might execute the grasp at the location associated with the highest grasp score. In particular, referring to FIG. 3, a robot designed in accordance with current approaches might grasp the bottle at the location 312 that is close to the edge 308 and has the highest grasp score of the output 304. In accordance with an example embodiment, a processor, for instance the system 104 can loop through the sorted list of scores 208 so as to filter out scores 208 that are incorrectly labeled as high grasp scores. For example, the system 104 can determine respective distances between locations associated with grasp scores adjacent to each other in the sorted list of scores 208. After the distances are determined, the system 104 can compare the distances to a minimum distance. By way of example, if the distance between the highest ranked score and the second highest ranked score is greater than the minimum distance, the highest ranked score can be rejected as representing the best grasp location. Thus, continuing with the example, the location having the highest ranked score can be identified as an outlier or incorrectly labeled grasp location. In some examples, the minimum distance can relate to size properties of the end effector 114. By way of example, and without limitation, the minimum distance may be defined by a diameter or length of a suction cup of a vacuum gripper (e.g., half the diameter of the suction cup). By defining the minimum distance based on the size of the end effector 114, when a first grasp location is rejected for any reason, it can be ensured that the second grasp location does not suffer from the same problem as the first grasp location because the second grasp location is sufficiently far away (e.g., greater than the minimum distance) from the first grasp location. Furthermore, in some cases, after determining the distances between grasp locations associated with adjacent grasp scores in the sorted list, the respective distances can be compared to the minimum distance to determine that the grasp locations are proximate to each other. In some cases, after determining that the distance between grasp candidate locations (e.g., locations having high scores) is less than the minimum distance so as to identify the associated grasp locations as being proximate to each other, the associated grasp locations can be labeled with a single grasp score. For example, the single grasp score can be the highest of the individual scores.

Figure 4:
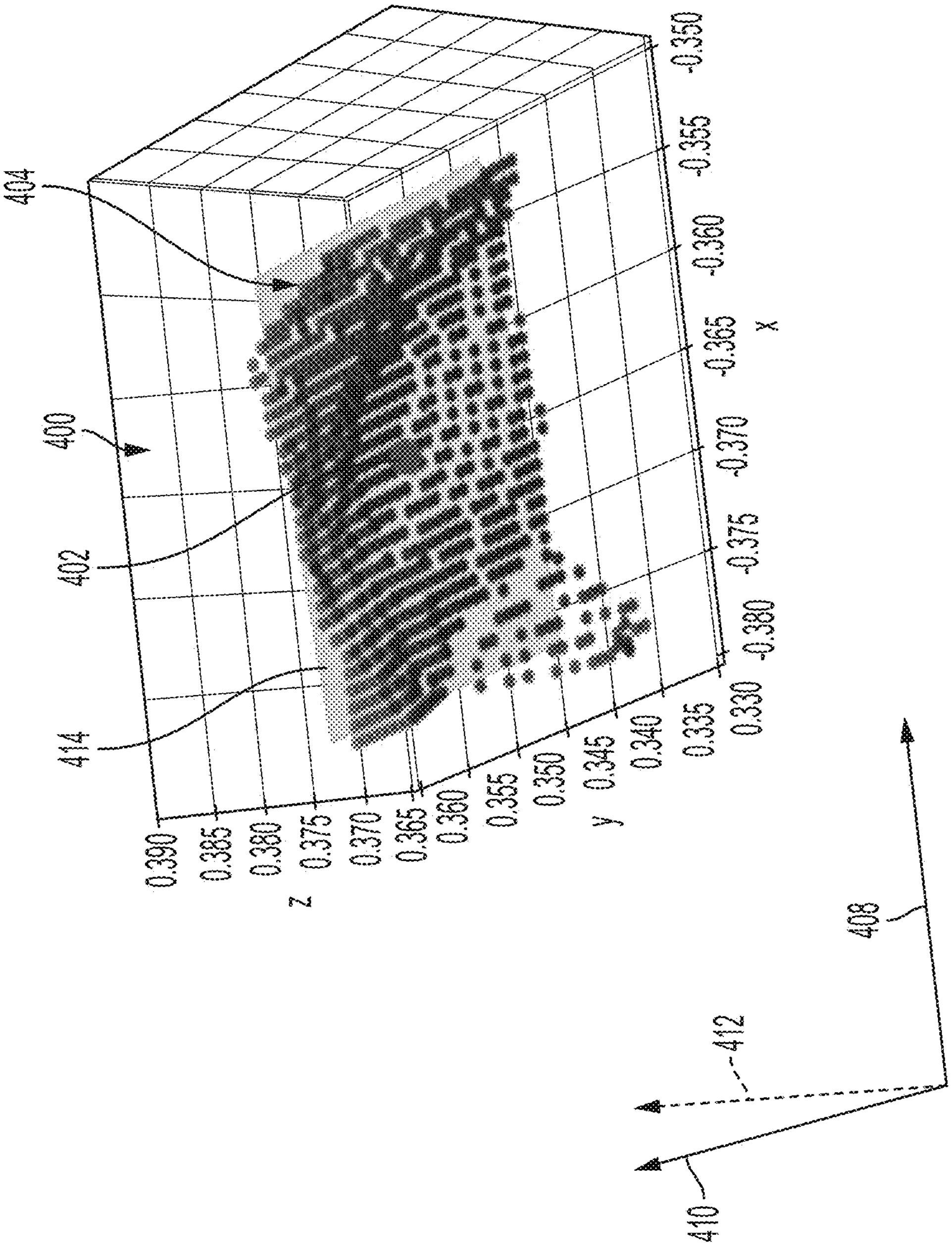
FIG. 4 shows an example point cloud that illustrates an example of how neural network outputs can be transformed in accordance with some embodiments.

Referring also to FIG. 4, as described above, an example technical problem that can result from covariate shift during grasp execution is when the system identifies grasp locations that are close to edges. Executing a grasp that is too close to an edge can result in a grasp failure. For example, a vacuum gripper might fail to perform a grasp close to an edge because its vacuum seal might not be formed at the edge. In accordance with an example embodiment, autonomous systems, for instance the system 102, rejects grasps that are too close to edges before attempting to execute the grasps.

Referring in particular to FIG. 4, given a grasp neural network output, such as the output 304 that defines grasp pixels and associated grasp scores, the system can extract a given grasp pixel or point 402 and a plurality of pixels or points 404 that surround the grasp point 402 so as to generate a point cloud 400. The point cloud 400 can define coordinates along a first direction 408 (e.g., x-axis), a second direction 410 (e.g., y-axis), and third direction 412 (z-axis). Thus, the grasp point 402 and the surrounding points 404 can be defined by coordinates along the first, second, and third directions 408, 410, and 412, respectively. The second direction 410 can be substantially perpendicular to the first direction 408, and the third direction 412 can be substantially perpendicular to both the first and second directions 408 and 410, respectively. In some examples, the point cloud 400 can define a surface that corresponds to a surface defined by a gripper of the end effector 114. In some examples, the point cloud is reconstructed from the depth information that comes from the camera, and that the neural network can use to compute the initial grasp. For example, in some cases, the gripper includes a suction cup that defines an area in which the suction cup is configured to grasp an object with a vacuum seal, and the area defined by the point cloud 400 can represent the area defined by the suction cup. In an example, the system can fit a plane 414 through the points 404 of the point cloud 400. The plane can be fitted by least squares regression, which can take into account all points of the point cloud.

After the plane 414 is fitted, the system can compute respective residual values of the plane 414 with respect to each point 402. The residual values can define an indication of the deviation of each point 414 to the plane 414. In some examples, the deviation defined by the residual values is a distance from the respective point 414 to the plane 402 along a direction that is substantially perpendicular to the plane, such that the direction along which the distance is measures is normal with respect to the face of the plane. In various examples, when there is an edge of the object represented by the point cloud 400 that is close to the grasp point 402, the computed residual values have a wide variance with respect to each other. By way of further example, when the area defines a flat surface, there is less variance among the residual values than when the area defines a curved surface that might represent an edge. The system can compare the residual values to a predetermined threshold. Based on the comparison, the system can determine or detect whether an edge is near the grasp point 402. For example, in some cases, when a given residual value is greater than the predetermined threshold, the system detects an edge. In an example, the threshold can be a tuning parameter that is set by an engineer who deploys the system. The point cloud 400 can be used to detect an edge using additional or alternative computations, and all such computations are contemplated as being within the scope of this disclosure. In an alternative example, edge detection can be performed in accordance with the Canny edge detection algorithm, which can detect edges directly in the depth image. An alternative method for edge detection is the Canny edge detection algorithm. This algorithm can detect edges directly in the depth image.

In another example, a grasp point associated with a high grasp score that is close to an edge can be modified instead of rejected. For example, the system can determine that a given grasp point is classified as a grasp candidate, based on a score associated with the grasp point. The system can also determine that the given grasp point is proximate to an edge of the object, for instance based on the residual values discussed above. Further, based on the respective residual values associated with the given grasp point, the system can move the grasp point away from the edge a predetermined distance. The grasp point can be moved along the positive gradient of the residual plane, which may coincide with the direction pointing away from the edge. In various examples, the distance by which the grasp point is moved can be set. In some cases, the predetermined distance is based on the size or geometry of the end effector 116. For example, the system might move the grasp point by a distance associated with the size of a suction cup (e.g., at least, or equal to, half the diameter of the suction cup) of the end effector 116.

In another example, the system can define a test-domain around, or proximate to, an original grasping point that has a high grasp score and is near or on an edge. Based on the test-domain, the system can formulate and solve a constrained optimization problem, so as to determine the point in the test domain that defines the best grasp quality and that is sufficiently far from the edge. For example, the system can perform a kernel-based convolution that indicates areas or points without edges, which can be joined with a Lagrange multiplier and the grasp quality. When an original grasp point that is close to an edge is moved away from the edge so as to define a new grasp point, the grasp can be executed by the end effector 116 at the new grasp point.

Referring again to FIG. 3, the system 104 can generate outputs, for instance the neural network output 304, which can define a grasp parametrization that includes coordinates of the object that align with coordinates of the end effector 116, during a grasping operation. In particular, for example, the grasp parametrization may define coordinates of a given object that, during a grasp, align with the center of a suction cup. In some cases, the grasp parametrization further includes an approach vector. The approach vector may indicate a course or direction in which the end effector 116 follows during the grasp operation. In some examples, the system can perform an additional transformation to a neural network output, for instance the output 304, to generate an approach vector that ensures no collisions between the end effector 116 and other objects, such as bin walls or the like. Thus, the system can assess the direction or course of the approach vector, the geometry of the end-effector, the location of the grasp point so as to determine if collisions will occur. If the assessment results in the conclusion that a collision may occur, the system can alter the approach vector so as to define a new approach vector. By following the new approach vector, the end effector 116 can grasp the object without colliding with any objects that are not related to the intended grasp. The approach vector can be computed by fitting a tangential plane to the selected grasp point. The approach vector can define the normal vector of this tangential plane. The normal vector can be extended to determine whether robot arm would collide with anything, for example, if it follows along the normal vector toward the grasp point.

In various examples, the system implements geometric reasoning to reject grasps that would lead to collisions. For example, a grasp neural network output, for instance the output 304, can define grasp quality scores and approach angles for respective points or pixels. In some cases, the approach angle renders a given point having a high grasp quality scores as not feasible, for instance due to collisions. The system can formulate a constrained optimization problem to solve for a grasp point that has both a feasible (e.g., no collisions) approach angle and high grasp quality score. In some cases, to enhance performance, the candidate grasp points can be sorted in accordance with their scores, and only candidate points that have scores above a certain threshold are sampled and input into the optimization problem.

Without being bound by theory, in accordance with various embodiments, the outputs of grasp neural networks can be transformed so as to remedy problems related to covariate shift without regenerating a dataset and/or retraining the neural network. In particular, when operating conditions change, for instance camera noise changes or the physical environment changes, issues related to covariate shift are remedied by transforming the output of the neural network instead of retraining the neural network or using another dataset. Furthermore, embodiments described herein can be implemented with any grasp neural network to verify that grasp points are sufficiently away from edges or other geometric properties that might hinder the execution of the grasp.

Figure 5:
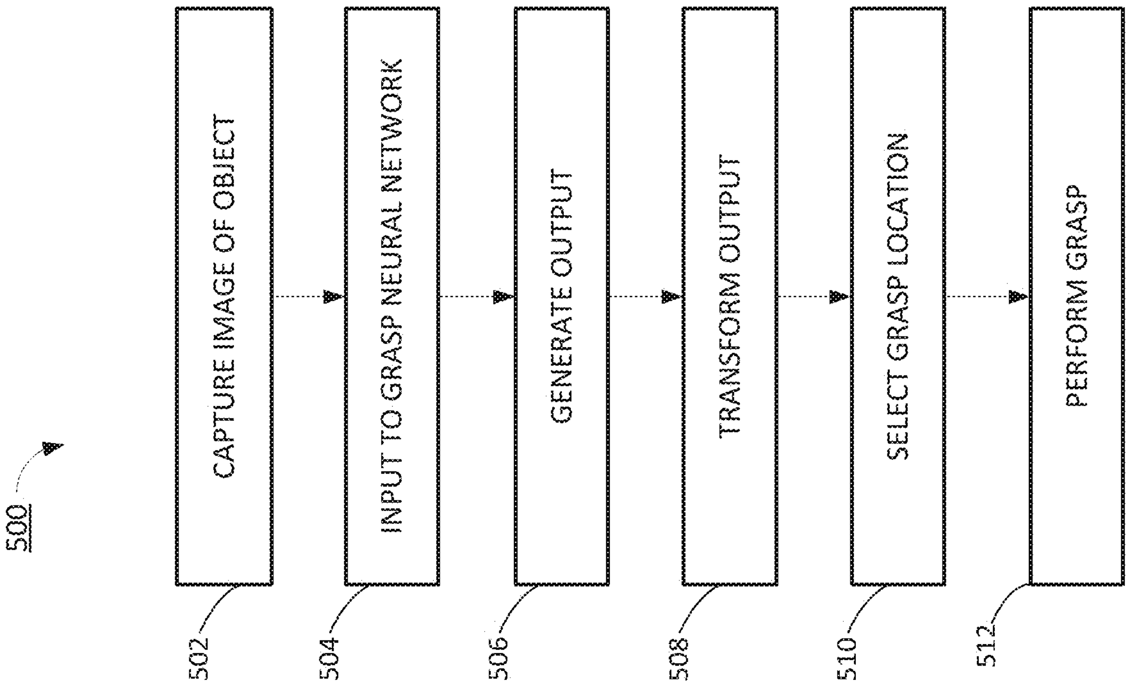
FIG. 5 is a flow diagram that illustrates an example operation that can be performed by an autonomous system in accordance with an example embodiment.

Referring now to FIG. 5, example operations 500 can be performed by an autonomous system that includes a neural network, for instance the autonomous system 102. At 502, an image of an object within a physical environment can be captured, for instance by the sensor or camera 118. Each of the object and the physical environment can define a plurality of locations. The image can define a plurality of pixels representative of the plurality of locations of the object and the physical environment. At 504, the image of the object within the physical environment can be sent or otherwise provided to a neural network of the autonomous system. At 506, based on the image, the neural network can generate an output that defines respective grasp scores associated with the plurality of pixels. The grasp scores may indicate a respective grasp quality at the locations of the object represented by the respective pixel. At 508, in accordance with various embodiments, the output of the neural network is transformed. Based on transforming the output of the neural network, at 510, a grasp location of the plurality of locations of the object can be selected. Transforming the output can include, in an example, identifying a first grasp score of the grasp scores that indicates a high grasp quality as compared to the other grasp scores, wherein the first grasp score is associated with a first location of the plurality of locations. Continuing with the example, transforming the output can further include rejecting the first grasp score that indicates the high grasp quality, such that the grasp location that is selected is associated with one of the grasp scores other than the first grasp score. In an example, the first grasp score is rejected because the system determines that the first location defines a point on the physical environment that is outside of the object. In other example, the first grasp score is rejected after sorting the grasp scores in an order from high grasp quality to low grasp quality, so as to define a sorted list of grasp scores that defines at least one grasp score proximate to the first grasp score; and determining that the respective locations associated with the at least one grasp score proximate to the first grasp score are greater than a predetermined distance away from the first location associated with the first grasp score. In yet another example, the object can define at least one edge, and the first grasp score can be associated with a first location. In such an example, rejecting the first grasp score can include determining a first distance from the first location to the at least one edge. The system can compare the first distance to a predetermined threshold, and the system can determine that the first distance is less than the predetermined threshold. The predetermined threshold can be based on the end effector of the autonomous machine, and/or the size of the end effector. For example, the predetermined threshold can be based on the diameter of a suction cup defined by the end effector.

Still referring to FIG. 5, in some cases, an instruction is sent to an autonomous machine to grasp the object at the grasp location. Based on the instruction and/or based on the transformation of the neural network output, the autonomous machine can grasp the object at the grasp location, at 512. Thus, a neural network can be trained on a plurality of objects. An image of a new object can be sent to the neural network, wherein the new object is not one of the plurality of objects on which the neural network is trained. Based on the image and the end effector, the neural network can generate an output that identifies grasp locations on the object. The output can define covariate shift, and the output can be transformed so as to eliminate the covariate shift. In particular, for example, at least one of the grasp locations identified by the neural network can be changed.

Figure 6:
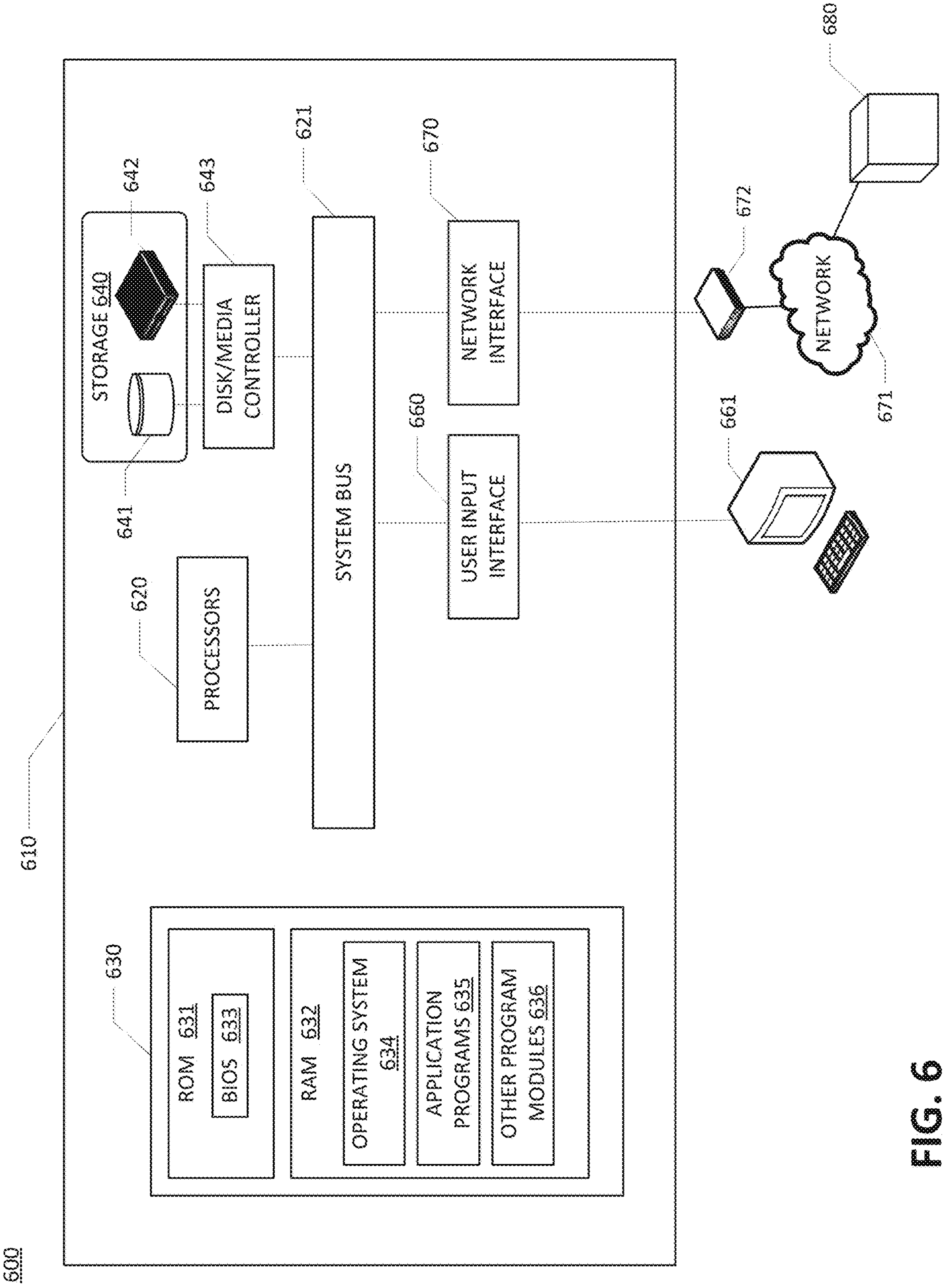
FIG. 6 illustrates a computing environment within which embodiments of the disclosure may be implemented.

FIG. 6 illustrates an example of a computing environment within which embodiments of the present disclosure may be implemented. A computing environment 600 includes a computer system 610 that may include a communication mechanism such as a system bus 621 or other communication mechanism for communicating information within the computer system 610. The computer system 610 further includes one or more processors 620 coupled with the system bus 621 for processing the information. The autonomous systems 102 may include, or be coupled to, the one or more processors 620.

The processors 620 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 620 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 621 may include at least one of a system bus, a memory bus, an address bus, or a message bus, and may permit exchange of information (e.g., data (including computer-executable code), signaling, etc.) between various components of the computer system 610. The system bus 621 may include, without limitation, a memory bus or a memory controller, a peripheral bus, an accelerated graphics port, and so forth. The system bus 621 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 6, the computer system 610 may also include a system memory 630 coupled to the system bus 621 for storing information and instructions to be executed by processors 620. The system memory 630 may include computer readable storage media in the form of volatile and/or nonvolatile memory, such as read only memory (ROM) 631 and/or random access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. System memory 630 may additionally include, for example, operating system 634, application programs 635, and other program modules 636. Application programs 635 may also include a user portal for development of the application program, allowing input parameters to be entered and modified as necessary.

The operating system 634 may be loaded into the memory 630 and may provide an interface between other application software executing on the computer system 610 and hardware resources of the computer system 610. More specifically, the operating system 634 may include a set of computer-executable instructions for managing hardware resources of the computer system 610 and for providing common services to other application programs (e.g., managing memory allocation among various application programs). In certain example embodiments, the operating system 634 may control execution of one or more of the program modules depicted as being stored in the data storage 640. The operating system 634 may include any operating system now known or which may be developed in the future including, but not limited to, any server operating system, any mainframe operating system, or any other proprietary or non-proprietary operating system.

The computer system 610 may also include a disk/media controller 643 coupled to the system bus 621 to control one or more storage devices for storing information and instructions, such as a magnetic hard disk 641 and/or a removable media drive 642 (e.g., floppy disk drive, compact disc drive, tape drive, flash drive, and/or solid state drive). Storage devices 640 may be added to the computer system 610 using an appropriate device interface (e.g., a small computer system interface (SCSI), integrated device electronics (IDE), Universal Serial Bus (USB), or FireWire). Storage devices 641, 642 may be external to the computer system 610.

The computer system 610 may also include a field device interface 665 coupled to the system bus 621 to control a field device 666, such as a device used in a production line. The computer system 610 may include a user input interface or GUI 661, which may comprise one or more input devices, such as a keyboard, touchscreen, tablet and/or a pointing device, for interacting with a computer user and providing information to the processors 620.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium of storage 640, such as the magnetic hard disk 641 or the removable media drive 642. The magnetic hard disk 641 (or solid state drive) and/or removable media drive 642 may contain one or more data stores and data files used by embodiments of the present disclosure. The data store 640 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 600 may further include the computer system 610 operating in a networked environment using logical connections to one or more remote computers, such as remote computing device 680. The network interface 670 may enable communication, for example, with other remote devices 680 or systems and/or the storage devices 641, 642 via the network 671. Remote computing device 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 680). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

It should be appreciated that the program modules, applications, computer-executable instructions, code, or the like depicted in FIG. 6 as being stored in the system memory 630 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 610, the remote device 680, and/or hosted on other computing device(s) accessible via one or more of the network(s) 671, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

It should further be appreciated that the computer system 610 may include alternate and/or additional hardware, software, or firmware components beyond those described or depicted without departing from the scope of the disclosure. More particularly, it should be appreciated that software, firmware, or hardware components depicted as forming part of the computer system 610 are merely illustrative and that some components may not be present or additional components may be provided in various embodiments. While various illustrative program modules have been depicted and described as software modules stored in system memory 630, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of grasping an object, the method comprising:

capturing an image of the object within a physical environment, each of the object and the physical environment defining a plurality of locations, the image defining a plurality of pixels representative of the plurality of locations of the object and the physical environment;

sending the image of the object within the physical environment to a neural network;

based on the image, the neural network generating an output that defines respective grasp scores associated with the plurality of pixels, the grasp scores indicating a respective grasp quality at the locations of the object represented by the respective pixel;

transforming the output of the neural network, wherein transforming the output of the neural network comprises:

sorting the grasp scores in order of grasp quality and, for grasp locations associated with adjacent grasp scores in the sorted list, determining respective distances, comparing the distances to a minimum distance, and rejecting a highest-ranked grasp location as an outlier based on a determination that the distance to a next highest-ranked location exceeds the minimum distance; and extracting a grasp point and surrounding points to generate a point cloud, fitting a plane through the points by least squares, computing residuals of the points to the plane, comparing the residuals to a predetermined threshold to detect whether an edge is near the grasp point, and, based on a determination that an edge is detected, moving the grasp point away from the edge by a predetermined distance based on a size or geometry of an end effector;

based on transforming the output of the neural network, selecting a grasp location of the plurality of locations of the object;

grasping the object, by an autonomous machine comprising an end effector, at the grasp location.

2. The method as recited in claim 1, wherein transforming the output of the neural network further comprises:

identifying a first grasp score of the grasp scores that indicates a high grasp quality as compared to the other grasp scores, the first grasp score associated with a first location of the plurality of locations; and rejecting the first grasp score that indicates the high grasp quality, such that the grasp location that is selected is associated with one of the grasp scores other than the first grasp score.

3. The method as recited in claim 2, wherein rejecting the first grasp score comprises:

determining that the first location defines a point on the physical environment outside of the object.

4. The method as recited in claim 2, wherein rejecting the first grasp score further comprises:

sorting the grasp scores in an order from high grasp quality to low grasp quality, so as to define a sorted list of grasp scores that defines at least one grasp score proximate to the first grasp score; and determining that the respective locations associated with the at least one grasp score proximate to the first grasp score are greater than a predetermined distance away from the first location associated with the first grasp score.

5. The method as recited in claim 2, wherein the object defines at least one edge, the first grasp score is associated with a first location, and rejecting the first grasp score further comprises:

determining a first distance from the first location to the at least one edge;

comparing the first distance to a predetermined threshold; and determining that the first distance is less than the predetermined threshold.

6. The method as recited in claim 5, wherein the autonomous machine comprises an end effector configured to grasp the object, and the predetermined threshold is based on the end effector.

7. The method as recited in claim 6, wherein the predetermined threshold is based on a size of the end effector.

8. The method as recited in claim 7, wherein the end effector includes a suction cup having a diameter, and the predetermined threshold is based on the diameter.

9. The method as recited in claim 2, wherein transforming the output of the neural network further comprises:

identifying a first grasp score that indicates a high grasp quality as compared to the other grasp scores, the first grasp score associated with a first location of the plurality of locations;

determining a first distance between an edge of the object and the first location;

based on the first distance, determining a second distance; and selecting the grasp location such that the grasp location is the second distance away from the first location.

10. A non-transitory computer-readable storage medium including instructions that, when processed by a computing system, configure the computing system to perform the method according to claim 1.

11. The method of claim 1, wherein the autonomous machine comprises an end effector that includes a suction cup, and wherein transforming the output comprises comparing distances between locations associated with grasp scores to a minimum distance that relates to size properties of the end effector and is defined based on a diameter of the suction cup, and selecting the grasp location by moving a grasp point away from an edge by a distance that is at least half the diameter of the suction cup.

* * * * *